United States Patent
Fujita et al.

(10) Patent No.: US 9,529,847 B2
(45) Date of Patent: Dec. 27, 2016

(54) INFORMATION PROCESSING APPARATUS, INFORMATION PROCESSING METHOD, AND PROGRAM FOR EXTRACTING CO-OCCURRENCE CHARACTER STRINGS

(71) Applicant: SONY CORPORATION, Tokyo (JP)

(72) Inventors: Takuya Fujita, Kanagawa (JP); Mitsuhiro Miyazaki, Kanagawa (JP); Takehiro Hagiwara, Tokyo (JP); Takahito Migita, Tokyo (JP); Hiroyuki Masuda, Kanagawa (JP); Katsuyoshi Kanemoto, Chiba (JP); Masahiro Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 14/554,403

(22) Filed: Nov. 26, 2014

(65) Prior Publication Data

US 2015/0113016 A1 Apr. 23, 2015

Related U.S. Application Data

(63) Continuation of application No. 13/469,346, filed on May 11, 2012, now Pat. No. 8,983,997.

(30) Foreign Application Priority Data

May 18, 2011 (JP) ................. 2011-111645

(51) Int. Cl.
*G06F 17/30* (2006.01)
(52) U.S. Cl.
CPC ... *G06F 17/30448* (2013.01); *G06F 17/30477* (2013.01); *G06F 17/30646* (2013.01); *G06F 17/30864* (2013.01)

(58) Field of Classification Search
CPC .......... G06F 17/30448; G06F 17/30477; G06F 17/30646; G06F 17/30864
(Continued)

(56) References Cited

U.S. PATENT DOCUMENTS

| | | | |
|---|---|---|---|
| 6,338,057 B1 | 1/2002 | Weeks | |
| 8,185,526 B2 * | 5/2012 | Wen | G06F 17/30256 707/723 |

(Continued)

FOREIGN PATENT DOCUMENTS

| | | |
|---|---|---|
| JP | 2005-258678 | 9/2005 |
| JP | 2006-139484 | 6/2006 |

(Continued)

OTHER PUBLICATIONS

Nov. 11, 2014, JP communication issued for related JP application No. 2011-111645.

(Continued)

*Primary Examiner* — Hares Jami
(74) *Attorney, Agent, or Firm* — Paratus Law Group, PLLC

(57) ABSTRACT

There is provided an information processing apparatus including a setting unit that sets a search character string, a searching unit that searches information including the set search character string, and a determining unit that extracts a co-occurrence character string candidate group other than partial character strings appearing as only a part of other partial character strings, among all partial character strings appearing in a plurality of pieces of the information obtained as a search result, and determines a co-occurrence character string from the co-occurrence character string candidate group, on the basis of the extracted co-occurrence character (Continued)

string candidate group and kinds of characters used in characters before and after the co-occurrence character string candidate group.

9 Claims, 14 Drawing Sheets

(58) Field of Classification Search
USPC .................. 707/759, 765, 766, 767, 769
See application file for complete search history.

(56) References Cited

U.S. PATENT DOCUMENTS

| | | |
|---|---|---|
| 2002/0194166 A1 | 12/2002 | Fowler |
| 2005/0102267 A1 | 5/2005 | O'Reilly et al. |
| 2006/0190447 A1 | 8/2006 | Harmon et al. |
| 2006/0206306 A1 | 9/2006 | Cao et al. |
| 2007/0150273 A1* | 6/2007 | Yamamoto ............... G10L 15/22 704/231 |
| 2007/0219961 A1 | 9/2007 | Burgel |
| 2008/0235209 A1 | 9/2008 | Rathod |
| 2009/0287676 A1 | 11/2009 | Dasdan |
| 2009/0319518 A1* | 12/2009 | Koudas ............. G06F 17/30864 |
| 2011/0055186 A1* | 3/2011 | Gopalakrishnan G06F 17/30867 707/706 |

FOREIGN PATENT DOCUMENTS

| | | |
|---|---|---|
| JP | 2009-015407 | 1/2009 |
| JP | 2010-257001 | 11/2010 |
| WO | WO2008/139568 | 11/2008 |
| WO | WO2011/053755 | 5/2011 |

OTHER PUBLICATIONS

Takayuki Adachi, et al., Vocabulary Getting Method from Small Paper Set, Presentation Paper Collection of Ninth Annual Convention of the Association for Natural Language Processing, Japan, The Association for Natural Language Processing, Mar. 18, 2003, pp. 274-277.

European Search Report in Application No. 12166505.3, dated Aug. 8, 2012, 6 pages.

* cited by examiner

PEOPLE | WHO | STOCK | UP | ON | CHOCOLATE | QUIETLY | RAISE | YOUR | HANDS

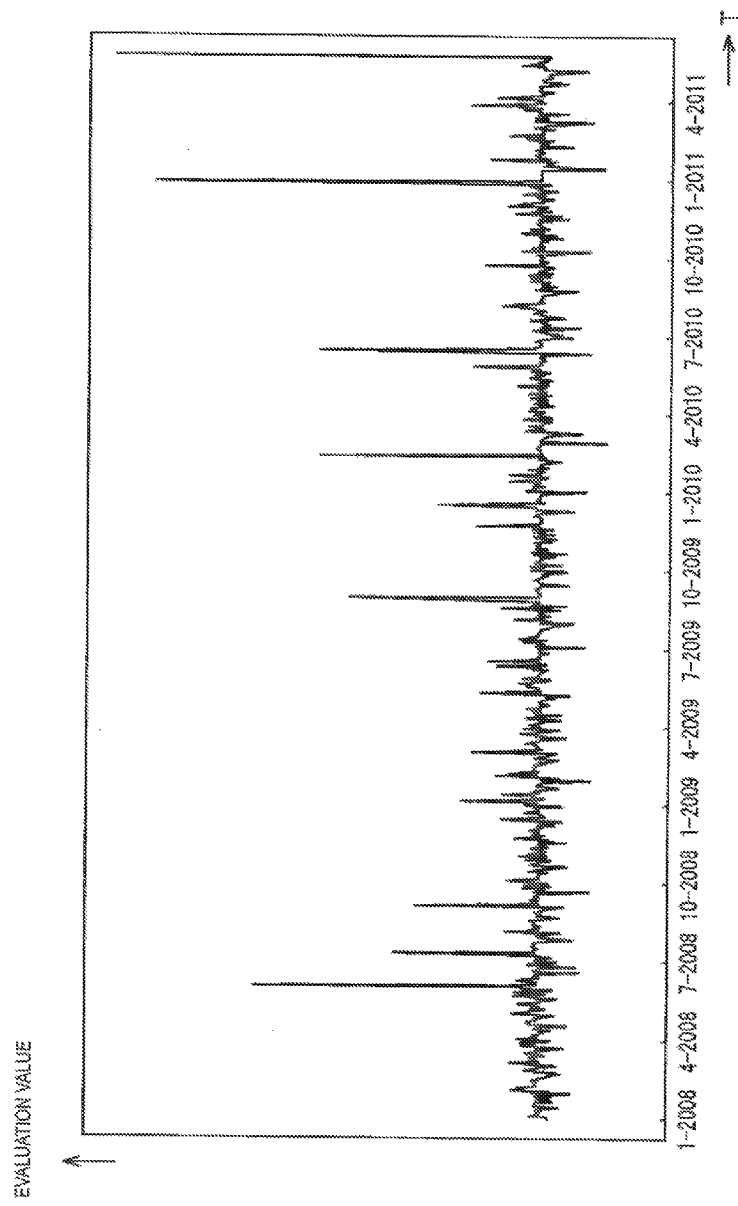

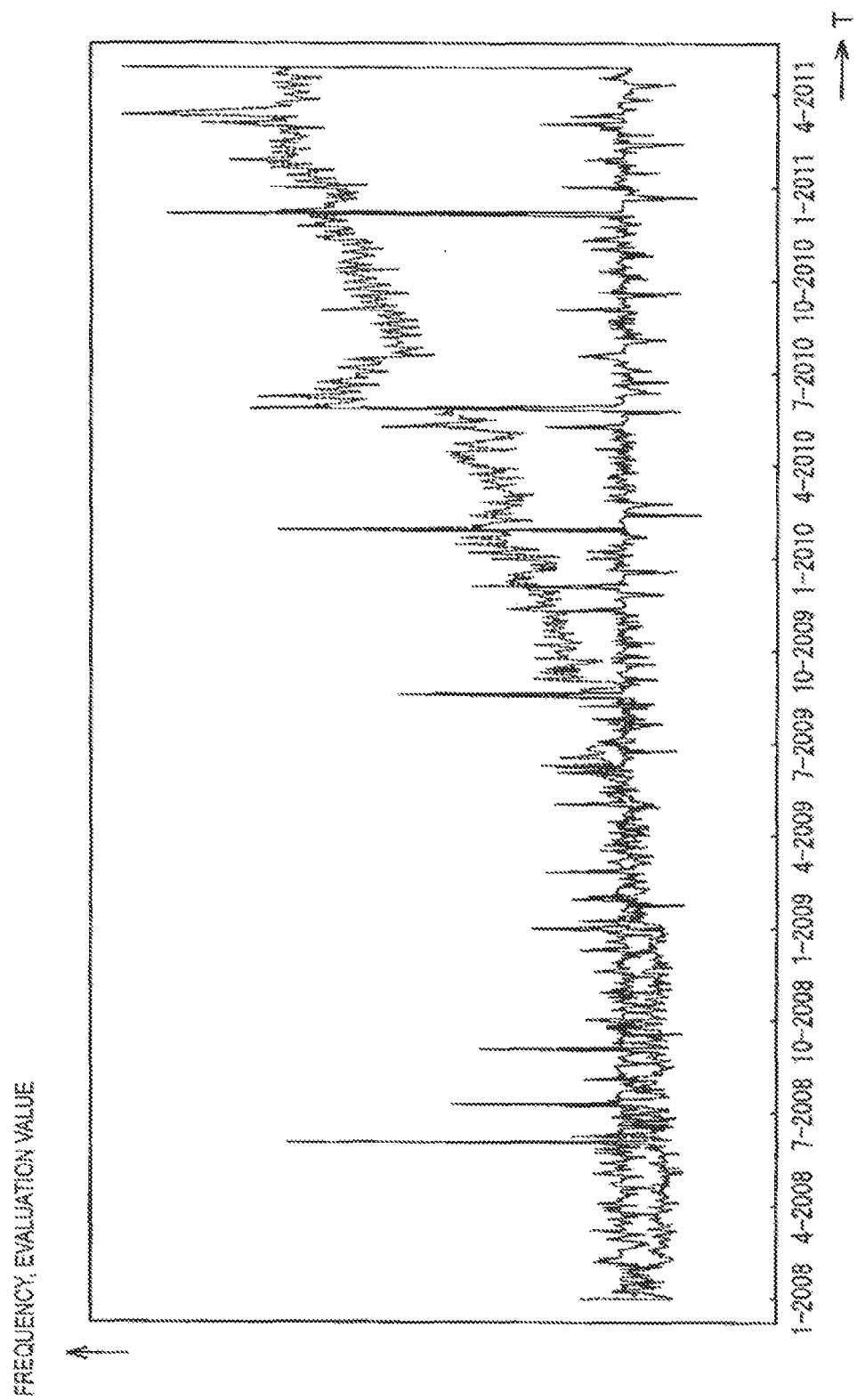

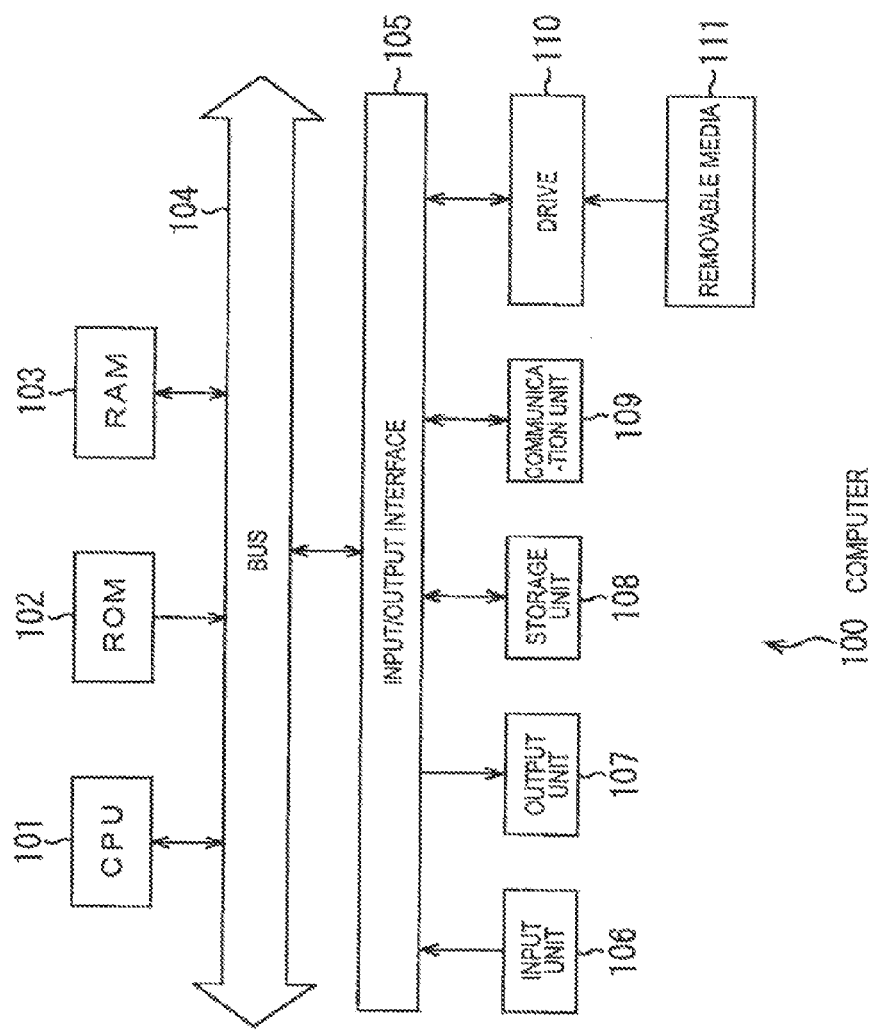

INFORMATION PROCESSING APPARATUS, INFORMATION PROCESSING METHOD, AND PROGRAM FOR EXTRACTING CO-OCCURRENCE CHARACTER STRINGS

CROSS REFERENCE TO PRIOR APPLICATION

This application is a continuation of U.S. patent application Ser. No. 13/469,346 (filed on May 11, 2012), which claims priority to Japanese Patent Application No. 2011-111645 (filed on May 18, 2011), which are all hereby incorporated by reference in their entirety.

BACKGROUND

The present disclosure relates to an information processing apparatus, an information processing method, and a program and particularly, to an information processing apparatus, an information processing method, and a program that enable information associated with a search keyword to be provided to a user.

Conventionally, in addition to web pages and blogs, the Internet has become flooded with a variety of information using various social networking services (SNS), a representative of which is Twitter. In addition, a system that extracts information including an arbitrary keyword from the variety of information is known.

Specifically, if an existing search system is used, information including a search condition can be provided to a user using a keyword set arbitrarily by the user as the search condition. In addition, new information or frequently searched information can be provided to the user, according to the freshness or the search frequency of the information including the search keyword (for example, refer to Japanese Laid-Open Patent Publication No. 2009-15407).

SUMMARY

As described above, the information including the search keyword can be searched in the related art. However, technology for providing information in which a user interests among the information associated with the search keyword or extracting information that has become a popular topic in the world from the information associated with the search keyword has not been established. Because the conventional technology includes processing depending on a language, the conventional technology can be applied only to information in a specific language.

The present disclosure has been made in view of the above circumstances and enables information in which a user is interested to be provided among information associated with a search keyword, without depending on a language.

According to an embodiment of the present disclosure, there is provided an information processing apparatus which includes a setting unit that sets a search character string, a searching unit that searches information including the set search character string, and a determining unit that extracts a co-occurrence character string candidate group other than partial character strings appearing as only a part of other partial character strings, among all partial character strings appearing in a plurality of pieces of the information obtained as a search result, and determines a co-occurrence character string from the co-occurrence character string candidate group, on the basis of the extracted co-occurrence character string candidate group and kinds of characters used in characters before and after the co-occurrence character string candidate group.

The information processing apparatus according to the embodiment of the present disclosure may further include a first providing unit that provides the determined co-occurrence character string to a user, such that the co-occurrence character string is selected by the user and a second providing unit that provides information including the selected co-occurrence character string among the plurality of information obtained as the search result to the user.

The information processing apparatus according to the embodiment of the present disclosure may further include a determining unit that calculates an evaluation value of the popularity with respect to the determined co-occurrence character string and determines a popularity index. The first providing unit may provide the determined co-occurrence character string to the user on the basis of the evaluation value, such that the co-occurrence character string is selected by the user.

The information processing apparatus according to the embodiment of the present disclosure may further include a selecting unit that selects the co-occurrence character string on the basis of the determined popularity index.

The information processing apparatus according to the embodiment of the present disclosure may further include a noise removing unit that removes noises from the plurality of information obtained as the search result. The determining unit may extract the co-occurrence character string candidate group from the plurality of noise removed information obtained as the search result.

The setting unit may set a character string input by the user as the search character string or set a character string extracted on the basis of an operation history of the user as the search character string.

The setting unit may set one or more contrast character strings to characterize the search character string.

The determining unit may determine the co-occurrence character string, on the basis of the comparison result of the appearance frequency of each co-occurrence character string candidate forming the co-occurrence character string candidate group in the information including the search character string and the appearance frequency of each co-occurrence character string candidate in information including the contrast character string.

The setting unit may set a character string input by the user as the contrast character string, set a character string extracted on the basis of an operation history of the user as the contrast character string, or set a character string extracted on the basis of the search character string as the contrast character string.

According to another embodiment of the present disclosure, there is provided an information processing method performed by an information processing apparatus which includes setting a search character string, searching information including the set search character string, and extracting a co-occurrence character string candidate group other than partial character strings appearing as only a part of other partial character strings, among all partial character strings appearing in a plurality of pieces of the information obtained as a search result, and determining a co-occurrence character string from the co-occurrence character string candidate group, on the basis of the extracted co-occurrence character string candidate group and kinds of characters used in characters before and after the co-occurrence character string candidate group.

According to another embodiment of the present disclosure, there is provided a program for causing a computer to function as a setting unit that sets a search character string, a searching unit that searches information including the set search character string, and a determining unit that extracts a co-occurrence character string candidate group other than partial character strings appearing as only a part of other partial character strings, among all partial character strings appearing in a plurality of pieces of the information obtained as a search result, and determines a co-occurrence character string from the co-occurrence character string candidate group, on the basis of the extracted co-occurrence character string candidate group and kinds of characters used in characters before and after the co-occurrence character string candidate group.

According to the embodiments of the present disclosure described above, the search character string is set, the information including the set search character string is searched, and the co-occurrence character string candidate group other than the partial character strings appearing as only the part of other partial character strings among all of the partial character strings appearing in the plurality of information obtained as the search result is extracted, and the co-occurrence character string is determined from the co-occurrence character string candidate group, on the basis of the extracted co-occurrence character string candidate group and the kinds of the characters used in the characters before and after the co-occurrence character string candidate group.

According to the embodiments of the present disclosure described above, information in which a user interests among information associated with a search keyword can be provided without depending on a language

BRIEF DESCRIPTION OF THE DRAWINGS

FIG. 12 is a diagram illustrating an evaluation value corresponding to FIG. 10;

FIG. 13 is a diagram illustrating a unified state of FIGS. 10 to 12; and

FIG. 14 is a block diagram illustrating a configuration example of a computer.

DETAILED DESCRIPTION OF THE EMBODIMENT(S)

Figure 1:
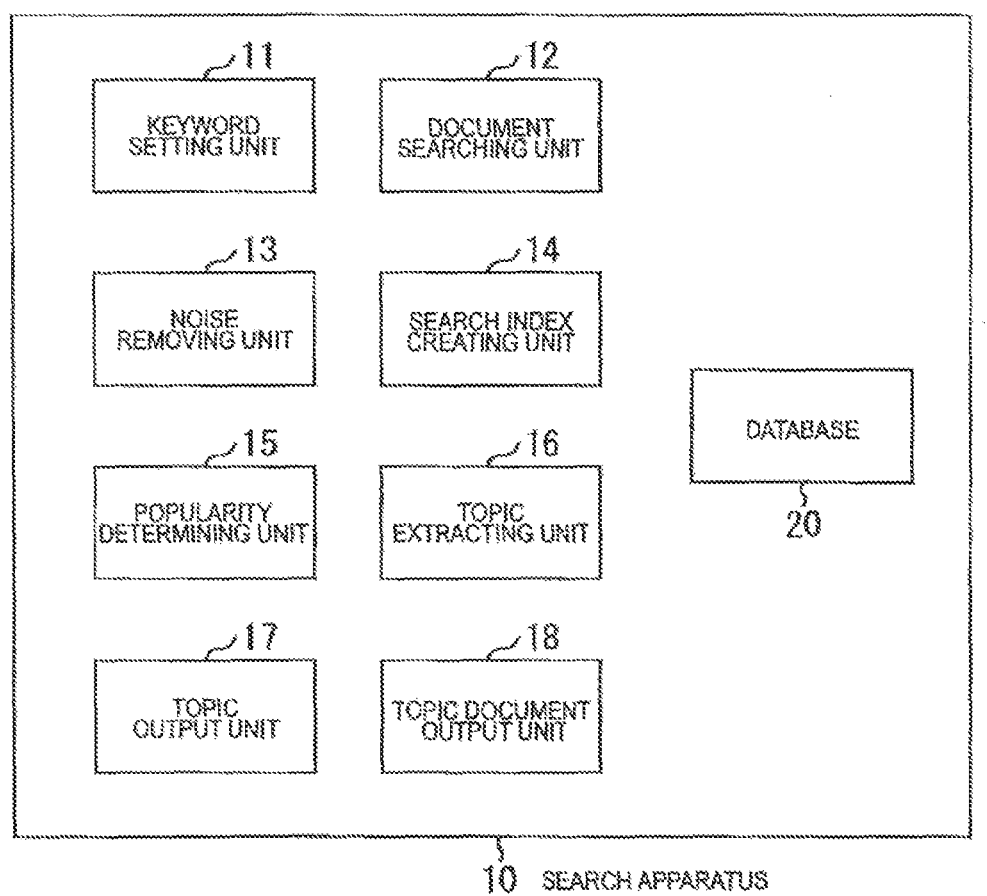
FIG. 1 is a block diagram illustrating a configuration example of a search apparatus to be an embodiment of the present disclosure.

Hereinafter, preferred embodiments of the present disclosure will be described in detail with reference to the appended drawings.

1. Embodiment

First, the outline of a search apparatus that corresponds to an embodiment to which an information processing apparatus according to the present disclosure is applied will be described. The search apparatus sets various documents shown on the Internet or an intranet as search objects, searches for documents including a search keyword, and extracts a character string (hereinafter referred to as co-occurrence keyword or topic) included commonly in the search documents. The search apparatus provides information that has become a popular topic in the world (a trending topic) at a predetermined point of time among the documents on the Internet including the search keyword and the co-occurrence keyword as information associated with search information.

For example, the search apparatus sets tweets (showing short sentences of 140 characters or less which users of Twitter post (input)) of Twitter shown on the Internet as search objects, searches the tweets including a search keyword, and extracts a co-occurrence keyword included commonly in the searched tweets. The search apparatus calculates an evaluation value showing popularity with respect to each extracted co-occurrence keyword, displays a list of evaluation values such that the co-occurrence keyword is selected by the user, and provides the tweets including the selected co-occurrence keyword and the search keyword to the user. Thereby, the tweets regarding the information that has become a popular topic in the world can be provided to the user.

For example, if the search keyword is set as "Sensoji Temple," "Taito Ward," "Gokokuji," "quake," "in Asakusa," and "intersection" are extracted as the co-occurrence keywords. If the user selects "quake" from the extracted co-occurrence keywords, the tweets that include the selected co-occurrence keyword "quake" and the search keyword "Sensoji Temple" are provided to the user.

The search keyword may be input by the user or may be automatically set on the basis of an operation history of the user. For example, a character string that appears frequently in a document created by the user, an artist name or a song title that is included in a play list created by the user, and a name of a star that appears frequently in a television program watched by the user may be extracted and may be set as the search keywords.

One or more contrast keywords may be set to be contrasted with the search keyword. Similar to the search keyword, the contrast keyword may be input by the user or may be automatically set on the basis of an operation history of the user. When the contrast keyword is automatically set, the contrast keyword may be determined on the basis of the set search keyword. For example, when the search keyword is the artist name, another artist who is from the same nation may be searched from information on the Internet and an artist name of the other artist may be determined as the contrast keyword.

For example, when AAA is set as the search keyword and BBB is set as the contrast keyword, the co-occurrence keyword is extracted from the plurality of tweets including the search keyword AAA. However, the keyword having the high appearance frequency in the plurality of tweets including the contrast keyword BBB is excluded.

A plurality of character strings may be set as the search keyword and the contrast keyword and an AND search may be performed.

Hereinafter, in the present disclosure, an example of the case in which each tweet of Twitter is set as the search object will be described. However, the search objects of the search apparatus to be the embodiment are not limited to tweets.

The search object document and the search keyword are not limited to a search object document and a search keyword represented by a natural language such as Japanese and English, as long as the search object document and the search keyword can be represented by a character string or a symbol string. For example, DNA information, phonemes, musical score information, data that is obtained by representing real number values to be quantized and included in a symbol string with a one-dimensional arrangement, and data that is obtained by representing data obtained by representing real number values to be quantized and included in a symbol string with a multi-dimensional arrangement with a one-dimensional arrangement may be set as the search object document and the search keyword.

[Configuration Example of Search Apparatus]

Figure 2:
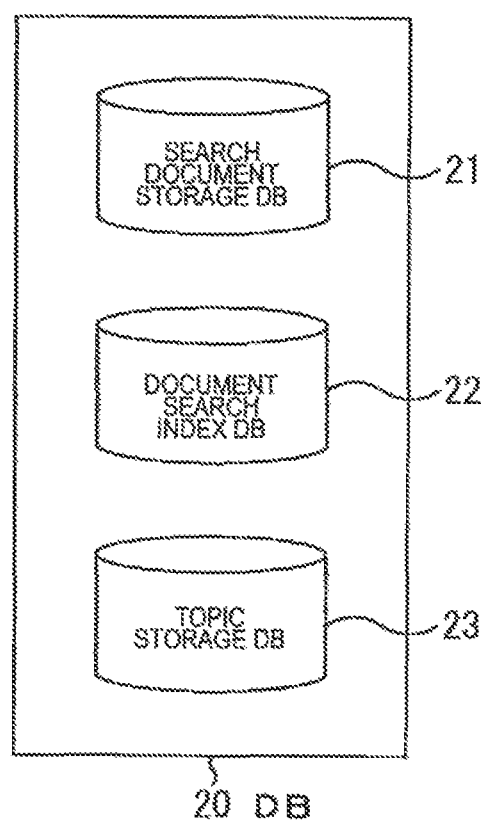
FIG. 2 is a block diagram illustrating a detailed configuration of a database.

FIG. 1 illustrates a configuration example of a functional block that is included in the search apparatus to be the embodiment. A search apparatus 10 includes a keyword setting unit 11, a document searching unit 12, a noise removing unit 13, a search index creating unit 14, a popularity determining unit 15, a topic extracting unit 16, a topic output unit 17, a topic document output unit 18, and a database 20. FIG. 2 illustrates a detailed configuration of a database (DB) 20. The database 20 includes a search document storage database (DB) 21, a document search index database (DB) 22, and a topic storage database (DB) 23.

The keyword setting unit 11 sets a character string input by the user as a search keyword. The keyword setting unit 11 sets a character string input by the user as a contrast keyword. The keyword setting unit 11 can automatically set at least one of the search keyword and the contrast keyword.

The document searching unit 12 sets each tweet of Twitter shown on the Internet as the search object and searches the tweets including the search keyword. The document searching unit 12 sets each tweet of Twitter shown on the Internet as the search object and searches the tweets including the contrast keyword. A period of a mentioned date and time of each tweet that is set as the search object may be limited from the present time to one month ago. The tweets that are obtained as the search result of the document searching unit 12 are associated with the search keyword or the contrast keyword and the association result is stored in the search document storage database 21 of the database 20.

The noise removing unit 13 removes a character string (hereinafter referred to as noise) not becoming the co-occurrence keyword from the tweets obtained as the search result. This will be specifically described below with reference to FIG. 4.

The search index creating unit 14 creates a search index based on Suffix Array with respect to the tweets to be stored in the search document storage database 20 and obtained as the search result. The created search index is stored in the document search index database 22 of the database 20. By creating the search index, the appearance frequency DF (Document Frequency) of a topic (co-occurrence keyword) candidate character string necessary when the co-occurrence keyword is extracted in each tweet can be counted at a high speed.

When the search keyword or the contrast keyword is automatically set, the popularity determining unit 15 determines popularities of candidates of the search keyword or the contrast keyword. The popularity determining unit 15 determines the popularity of the extracted co-occurrence keyword (topic).

The topic extracting unit 16 extracts the co-occurrence keyword (topic) from each tweet of the search result from which the noise is removed. The extracted co-occurrence keyword (topic) is stored in the topic storage database 23 of the database 20.

The topic output unit 17 outputs the extracted co-occurrence keyword (topic). The topic output unit 17 may have a bot creating function for creating a tweet automatically on the basis of the extracted co-occurrence keyword (topic) and posting the tweet on Twitter.

The topic document output unit 18 acquires the tweets including the extracted co-occurrence keyword (topic) from the search document storage database 21 and outputs the tweets.

[Description of Operation]

Figure 3:
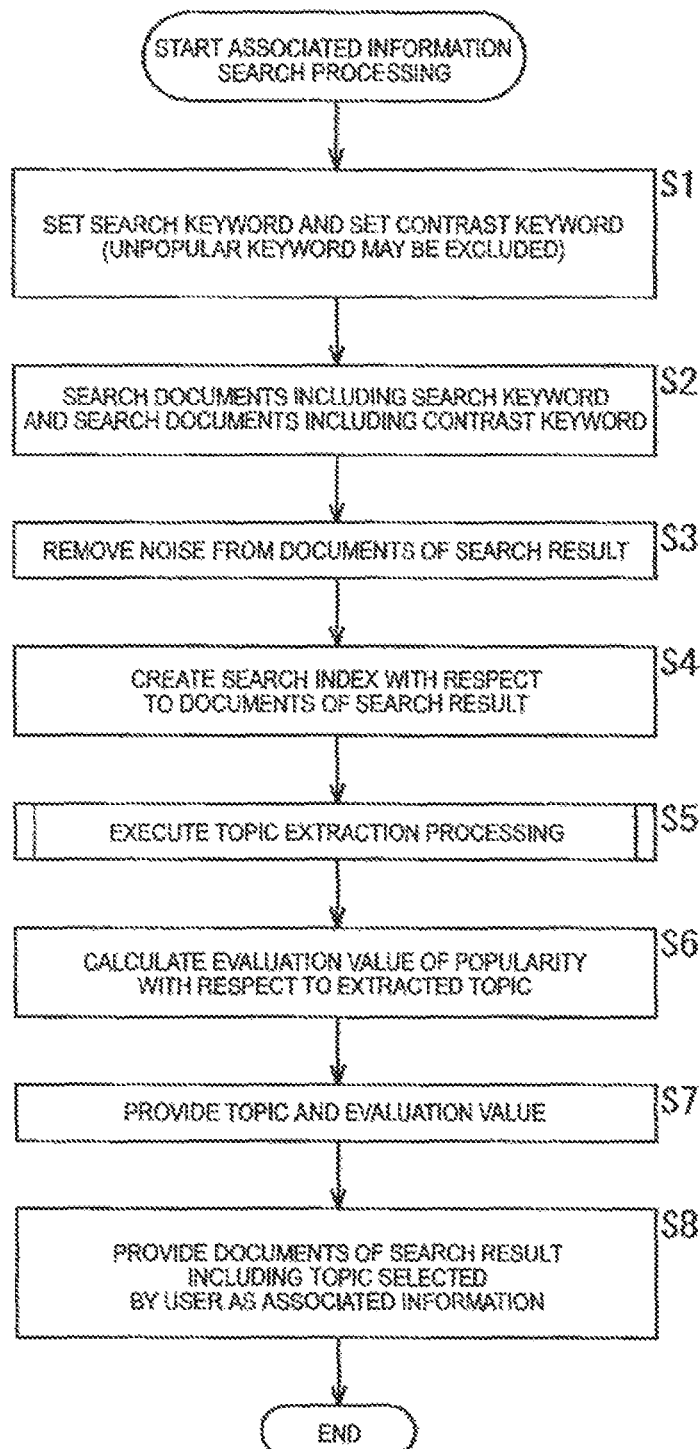
FIG. 3 is a flowchart illustrating associated information search processing executed by the search apparatus.

Next, an operation of the search apparatus 10 will be described. FIG. 3 is a flowchart illustrating associated information search processing that is executed by the search apparatus 10.

In step S1, the keyword setting unit 11 sets the character string input by the user as the search keyword. A character string that appears frequently in a document created by the user, an artist name or a song title that is included in a play list created by the user, and a name of a star that appears frequently in a television program watched by the user may be extracted and set as the search keywords. In this case, an evaluation value of the popularity to be described below may be calculated with respect to the extracted artist name and the artist name of which the evaluation value is a predetermined threshold value or more may be adopted as the search keyword.

In step S1, the keyword setting unit 11 sets the character string input by the user or the automatically determined character string as the contrast keyword. Setting of the contrast keyword may be omitted.

In step S2, the document searching unit 12 sets each tweet of Twitter shown on the Internet as the search object and searches the tweets including the search keyword. The tweets of the search result are associated with the search keyword and the association result is stored in the search document storage database 21. When the contrast keyword is set, the document searching unit 12 sets each tweet of Twitter shown on the Internet as the search object and searches the tweets including the contrast keyword. The tweets of the search result are associated with the contrast keyword and the association result is stored in the search document storage database 21.

In step S3, the noise removing unit 13 removes a noise not becoming the co-occurrence keyword from the tweets obtained as the search result.

Figure 4:
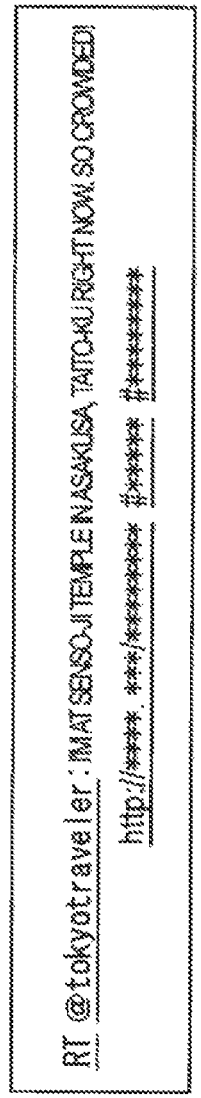
FIG. 4 is a diagram illustrating noise removal.

FIG. 4 illustrates a tweet that is an example of the search result. In FIG. 4, underlined character strings are removed as noises, by the noise removing unit 13. That is, when the search object is the tweet, "RT," meaning retweet, a destination "@user name" that shows a reply counterpart, "http:// . . . " that shows a URL, and "# . . . " that shows a hashtag are removed.

Returning to FIG. 3, in step S4, the search index creating unit 14 creates a search index based on Suffix Array with respect to the tweets to be stored in the search document storage database 20 and to be obtained as the search result. The created search index is stored in the document search index database 22.

In step S5, the topic extracting unit 16 executes topic extraction processing for extracting the co-occurrence keyword (topic) from each tweet of the search result from which the noise is removed. The extracted co-occurrence keyword (topic) is stored in the topic storage database 23 of the database 20.

Figure 5:
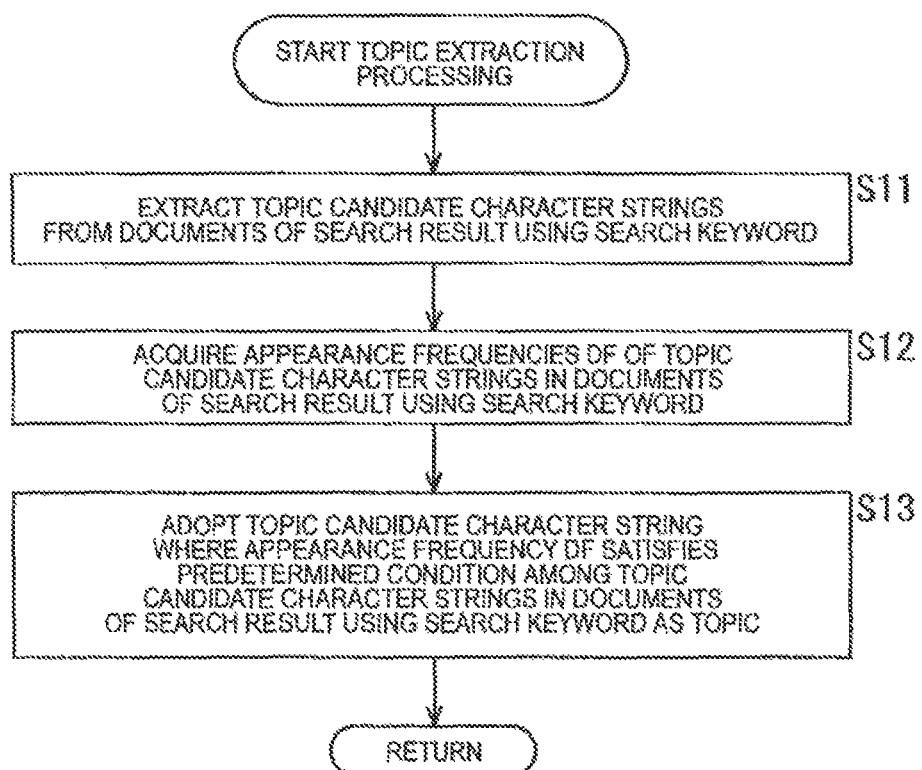
FIG. 5 is a flowchart illustrating topic extraction processing.

FIG. 5 is a flowchart specifically illustrating the topic extraction processing.

In step S11, the topic extracting unit 16 extracts a character string group other than partial character strings appearing as only a part of other partial character strings among all partial character strings appearing in a tweet group of the search result from which the noise is removed. This corresponds to extracting a longest partial character string group in a range in which the appearance frequency DF does not change. This processing can be executed at a high speed using the search index based on the Suffix Array.

The character strings that conform to the rule by the kind of the characters to be described below are excluded from the topic candidate character strings and the remaining character strings are extracted as the topic candidate character strings.

[Kinds of Characters Assumed]

As the kinds of the characters, a space (blank), a half-size English character, a Roman character expansion, hiragana, katakana, a full-size symbol, a macron, a half-size symbol, a control character, an invalid character, kanji, a half-size number, a punctuation mark, a Hangul character, a That character, an Arabic character, a Hebrew character, a Cyrillic character, and a Greek character are assumed.

[Rule to Exclude Token from Topic Candidate Character String]

When a character before a token (last character of a previous token) is a macron, the token is not designated as a topic candidate character string.

When a first character of the token is a space, the token is not designated as the topic candidate character string.

When the first character of the token is a full-size symbol, the token is not designated as the topic candidate character string.

When the first character of the token is a macron, the token is not designated as the topic candidate character string.

When the first character of the token is a half-size symbol, the token is not designated as the topic candidate character string.

When the first character of the token is a control character and an invalid character, the token is not designated as the topic candidate character string.

When the first character of the token is a punctuation mark, the token is not designated as the topic candidate character string.

When a character after a token (first character of a later token) is a macron, the token is not designated as a topic candidate character string.

When a last character of the token is a space, the token is not designated as the topic candidate character string.

When the last character of the token is a full-size symbol, the token is not designated as the topic candidate character string.

When the last character of the token is a half-size symbol, the token is not designated as the topic candidate character string.

When the last character of the token is a control character and an invalid character, the token is not designated as the topic candidate character string.

When the last character of the token is a punctuation mark, the token is not designated as the topic candidate character string.

When both the character before the token (final character of the previous token) and the first character of the token or the character after the token (first character of the later token) and the final character of the token are a half-size English character and a Roman character expansion, the token is not designated as the topic candidate character string.

When both the character before the token (final character of the previous token) and the first character of the token or the character after the token (first character of the later token) and the final character of the token are katakana, the token is not designated as the topic candidate character string.

When both the character before the token (final character of the previous token) and the first character of the token or the character after the token (first character of the later token) and the final character of the token are half-size numbers, the token is not designated as the topic candidate character string.

When both the character before the token (final character of the previous token) and the first character of the token or the character after the token (first character of the later token) and the final character of the token are Hangul characters, the token is not designated as the topic candidate character string.

When both the character before the token (final character of the previous token) and the first character of the token or the character after the token (first character of the later token) and the final character of the token are Cyrillic characters, the token is not designated as the topic candidate character string.

Figure 6:
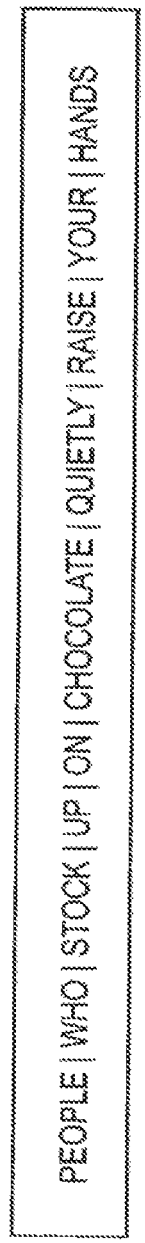
FIG. 6 is a diagram illustrating a topic candidate character string.

For example, as illustrated in FIG. 6, when the noise removed tweet is "People who stock up on chocolate raise your hands," first, the character string group other than the partial character strings appearing as only the part of other partial character strings among all of the partial character strings in the tweet group of the search result is extracted. For example, when the appearance frequencies DF of "cho," "chocolate," and "chocolate" are 10, 10, and 4, respectively, "chocolate" is extracted. However, "cho" is not extracted. Then, the topic candidate character strings are extracted by applying a rule to exclude the token from the topic candidate character strings.

As such, the topic extracting unit 16 can extract the topic candidate character strings on the basis of a change point of the appearance frequency DF and the difference of the kinds of the characters, without depending on languages of the search object documents. However, the topic extracting unit 16 may extract the topic candidate character strings using morphological analysis based on characteristics of the languages of the documents.

When similar character strings are extracted as the topic candidate character strings, the similar character strings may be collected as one character string. In this case, similar means that a similarity degree of the character string is high and that a similarity degree of an appearing document is high.

In step S12, the topic extracting unit 16 calculates the appearance frequency DF of each topic character string in the tweets of the search result from which the noise is removed, using the search index stored in the document search index database 22.

In step S13, the topic extracting unit 16 adopts a topic candidate character string in which the appearance frequency DF satisfies a predetermined condition as the topic (co-occurrence keyword). That is, when both the search keyword and the contrast keyword are set, the topic extracting unit 16 adopts a topic candidate character string where a value obtained by dividing the appearance frequency DF in the tweets of the search result using the search keyword by the appearance frequency DF in the tweets of the search result using the contrast keyword is the predetermined threshold value or more as the topic. When only the search keyword is set, the topic extracting unit 16 adopts a topic candidate character string where the appearance frequency DF in the tweets of the search result using the search keyword is the predetermined threshold value or more as the topic.

When it is determined whether the topic candidate character string is adopted as the topic, instead of using the appearance frequency DF described above, Information Gain, Mutual Information, Bi-Normal separation, Fold Change, and a correlation coefficient may be calculated and used. A test such as a chi-squared test to measure specificity of the topic may be performed.

After the topic is extracted as described above, the topic extraction processing ends and the process returns to step S6 of FIG. 3.

In step S6, the popularity determining unit 15 calculates an evaluation value of the popularity with respect to each co-occurrence keyword (topic) extracted in step S5. A calculation method will be described below with reference to FIGS. 9A to 13.

In step S7, the topic output unit 17 provides the extracted co-occurrence keyword (topic) and the evaluation value of the popularity thereof to the user. In step S8, when the search apparatus automatically sets the topic, the topic output unit 17 may not provide the extracted co-occurrence keyword (topic) and the evaluation value of the popularity thereof to the user.

If the provided co-occurrence keyword (topic) is selected by the user or the co-occurrence keyword where the evaluation value of the popularity is the threshold value or more is selected automatically by the search apparatus, in step S8, the topic document output unit 18 acquires the tweets including the extracted co-occurrence keyword (topic) and the search keyword from the search document storage database 21 and provides the tweets as the information associated with the search keyword to the user. When the plurality of acquired tweets are similar to each other, the plurality of tweets may be collected as one tweet and the tweet may be provided to the user. In this way, the series of operations that is executed as the associated information search processing ends.

[Display Example of Screen Functioning as User Interface]

Figure 7:
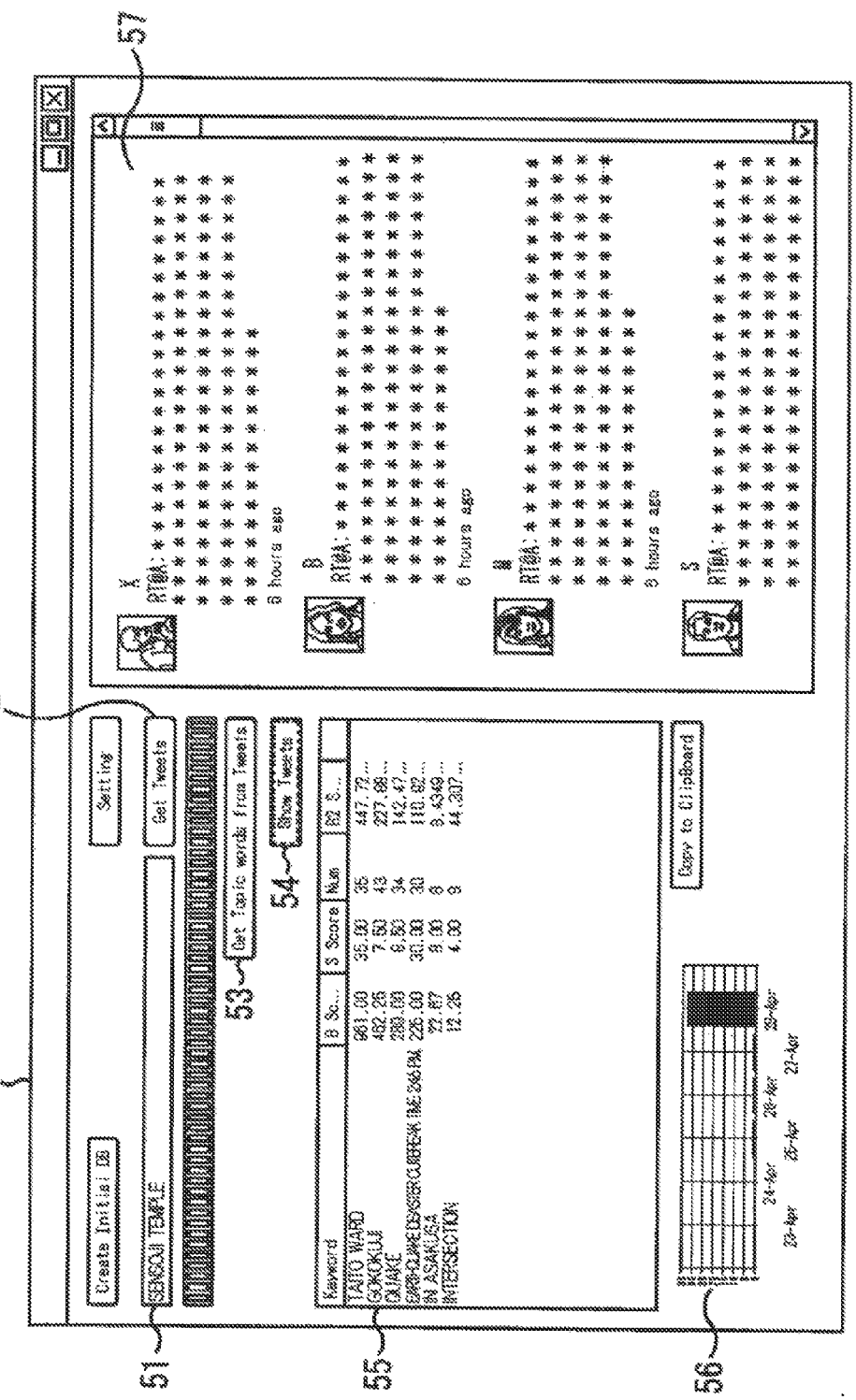
FIG. 7 is a diagram illustrating a display example of a screen that becomes a user interface of the search apparatus.

FIG. 7 illustrates a display example of a screen that functions as a user interface of the search apparatus 10. A screen 50 is provided with a search keyword input column 51, a Get Tweets button 52, a Get Topic Words from Tweets button 53, a Show Tweets button 54, a topic display column 55, an evaluation value display column 56, and a tweet display column 57.

The user can input the search keyword to the search keyword input column 51. If the user operates the Get Tweets button 52, the tweets including the search keyword are searched from the tweets of Twitter shown on the Internet.

If the user operates the Get Topic Words from Tweets button 53, the co-occurrence keyword (topic) is extracted from the tweets of the search result and the co-occurrence keyword and the evaluation value of the popularity are displayed on the topic display column 55. If the user selects the co-occurrence keyword (topic) displayed on the topic display column 55, a temporal transition of the evaluation value of the popularity with respect to the selected co-occurrence keyword (topic) is displayed on the evaluation value display column 56.

If the user operates the Show Tweets button 54 in a state in which the co-occurrence keyword (topic) is selected, the tweets including the search keyword and the selected co-occurrence keyword (topic) are displayed on the tweet display column 57.

For example, as illustrated in FIG. 7, if the user inputs "Sensoji Temple" as the search keyword to the search keyword input column 51 and operates the Get Tweets button 52, the tweets including the search keyword "Sensoji Temple" are searched. In this case, if the user operates the Get Topic Words from Tweets button 53, the co-occurrence keywords (topics) "Taito Ward," "Gokokuji," "quake," "earthquake disaster outbreak time: 2:46 p.m.," "in Asakusa," and "intersection" and the evaluation values of the popularities are displayed on the topic display column 55.

If the user selects "Taito Ward" from the co-occurrence keywords (topics) displayed on the topic display column 55, a temporal transition of the evaluation value of the popularity with respect to the selected co-occurrence keyword (topic) is displayed on the evaluation value display column 56.

If the user operates the Show Tweets button 54 in a state in which "Taito Ward" is selected as the co-occurrence keyword (topic), the tweets including the search keyword "Sensoji Temple" and the selected co-occurrence keyword (topic) "Taito Ward" are displayed on the tweet display column 57. In FIG. 7, however, sentences of the tweets are replaced with * (asterisks) in the tweet display column 57.

Figure 8:
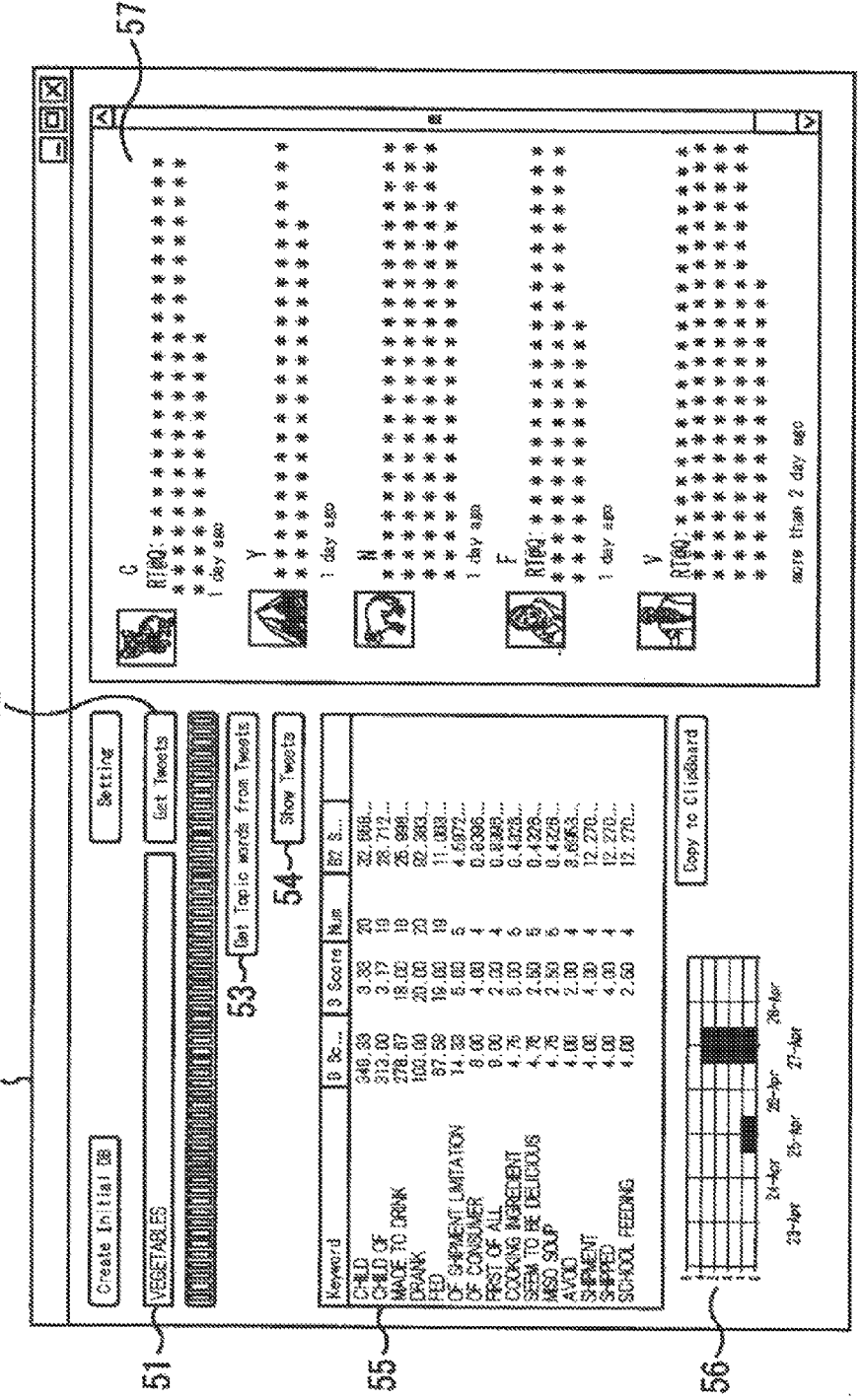
FIG. 8 is a diagram illustrating a display example of a screen that becomes a user interface of the search apparatus.
Figure 9:
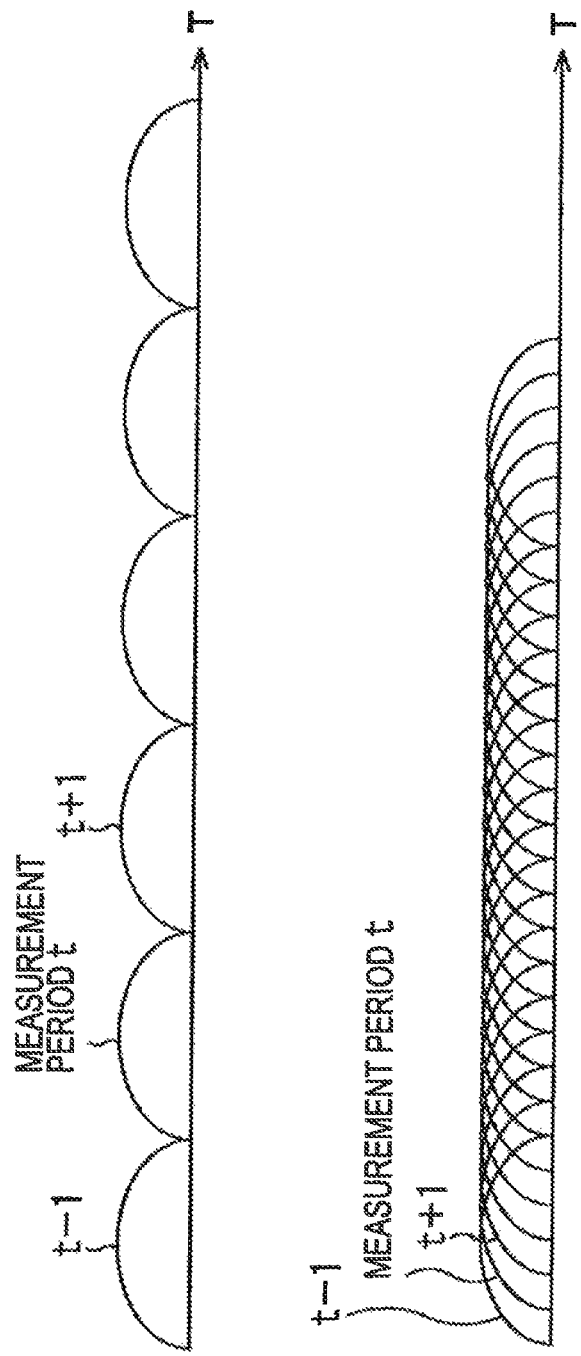
FIGS. 9A and 9B are diagrams illustrating a measurement period of the frequency.

For example, as illustrated in FIG. 8, if the user inputs "vegetables" as the search keyword on the search keyword input column 51 and operates the Get Tweets button 52, the tweets including the search keyword "vegetables" are searched. In this case, if the user operates the Get Topic Words from Tweets button 53, the co-occurrence keywords (topics) "child," "of child," "made to drink," "drank," "fed," "of shipment limitation," and "of consumer" and evaluation values of the popularities are displayed on the topic display column 55.

If the user selects "of shipment limitation" from the co-occurrence keywords (topics) displayed on the topic display column 55, a temporal transition of the evaluation value of the popularity with respect to the selected co-occurrence keyword (topic) is displayed on the evaluation value display column 56.

If the user operates the Show Tweets button 54 in a state in which "of shipment limitation" is selected as the co-occurrence keyword (topic), the tweets including the search keyword "vegetables" and the selected co-occurrence keyword (topic) "of shipment limitation" are displayed on the tweet display column 57. In FIG. 8, however, sentences of the tweets are replaced with * (asterisks) in the tweet display column 57.

As described above, the search apparatus 10 can collect the tweets including the topic in which a user is interested for each topic and can provide the tweets to the user. If the search keyword is automatically set, the search apparatus 10 can collect the tweets including the estimated topic in which a user is interested for each topic and can provide the tweets to the user.

[Method of Calculating Evaluation Value of Popularity]

Next, a method of calculating an evaluation value of the popularity of the co-occurrence keyword in step S6 of the associated information search processing will be described.

First, the appearance frequency DF of the co-occurrence keyword in the tweets of the search result is converted into time-series data of a discrete system on the basis of a posting date and time of the tweet in which the co-occurrence keyword appears. Specifically, the appearance frequency DF of the co-occurrence keyword is converted into the frequency in a predetermined measurement period (for example, 24 hours).

FIGS. 9A and 9B illustrate a method of setting a measurement period of the frequency. That is, as illustrated in FIG. 9A, measurement periods of the frequency may be set not to overlap at a time axis T and as illustrated in FIG. 9B, measurement periods of the frequencies may be set to overlap at a time axis T.

When the measurement periods of the frequencies are set not to overlap at the time axis T, a sum of the frequencies in each measurement interval becomes the appearance frequency DF. When the measurement periods of the frequencies are set to overlap at the time axis T, samples of the plurality of frequencies can be acquired in a short period.

When the frequency in a certain measurement period t is set as $x_t$, an evaluation value $s_t$ of the popularity in the measurement period t is calculated using the frequencies $x_t$, $x_{t-1}$, $x_{t-2}$, ..., and $x_{t-N+1}$ in N previous measurement periods t, t−1, t−2, ..., and t−N+1 from the measurement period t.

Specifically, a movement mean $m_t$, a movement deviation $v_t$, and an evaluation value $s_t$ are sequentially calculated.

$$\text{Movement Mean } m_t = (\Sigma x_i)/N \quad (1)$$

$$\text{Movement Deviation } v_t = \sqrt{((\Sigma(m_t - x_i))/N)} \quad (2)$$

$$\text{Evaluation Value } s_t = v_t/v_{t-1} \quad (3)$$

$\Sigma$ means a sum of N values corresponding to i=t to i=t−N+1.

Figure 10:
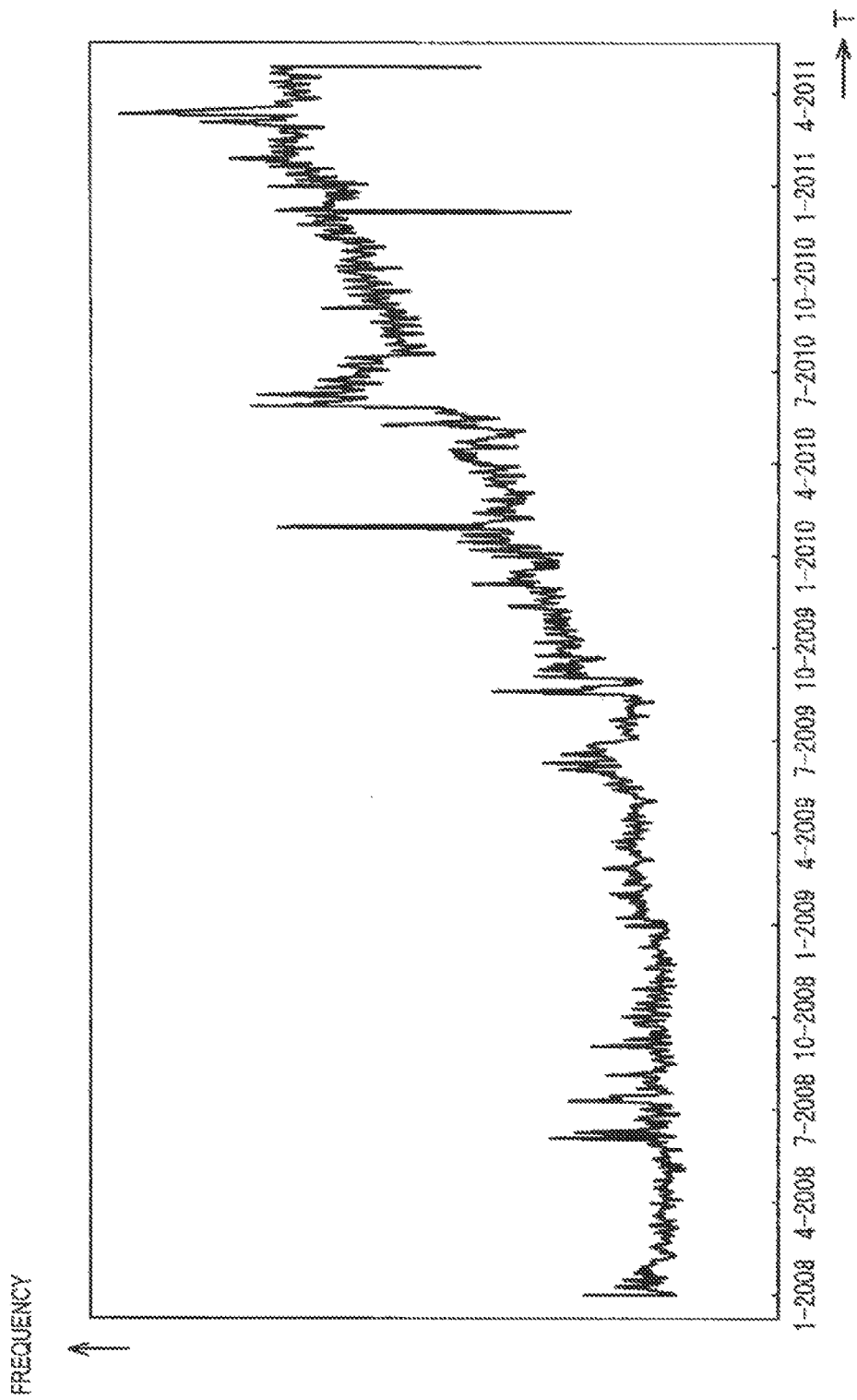
FIG. 10 is a diagram illustrating an example of a frequency transition.
Figure 11:
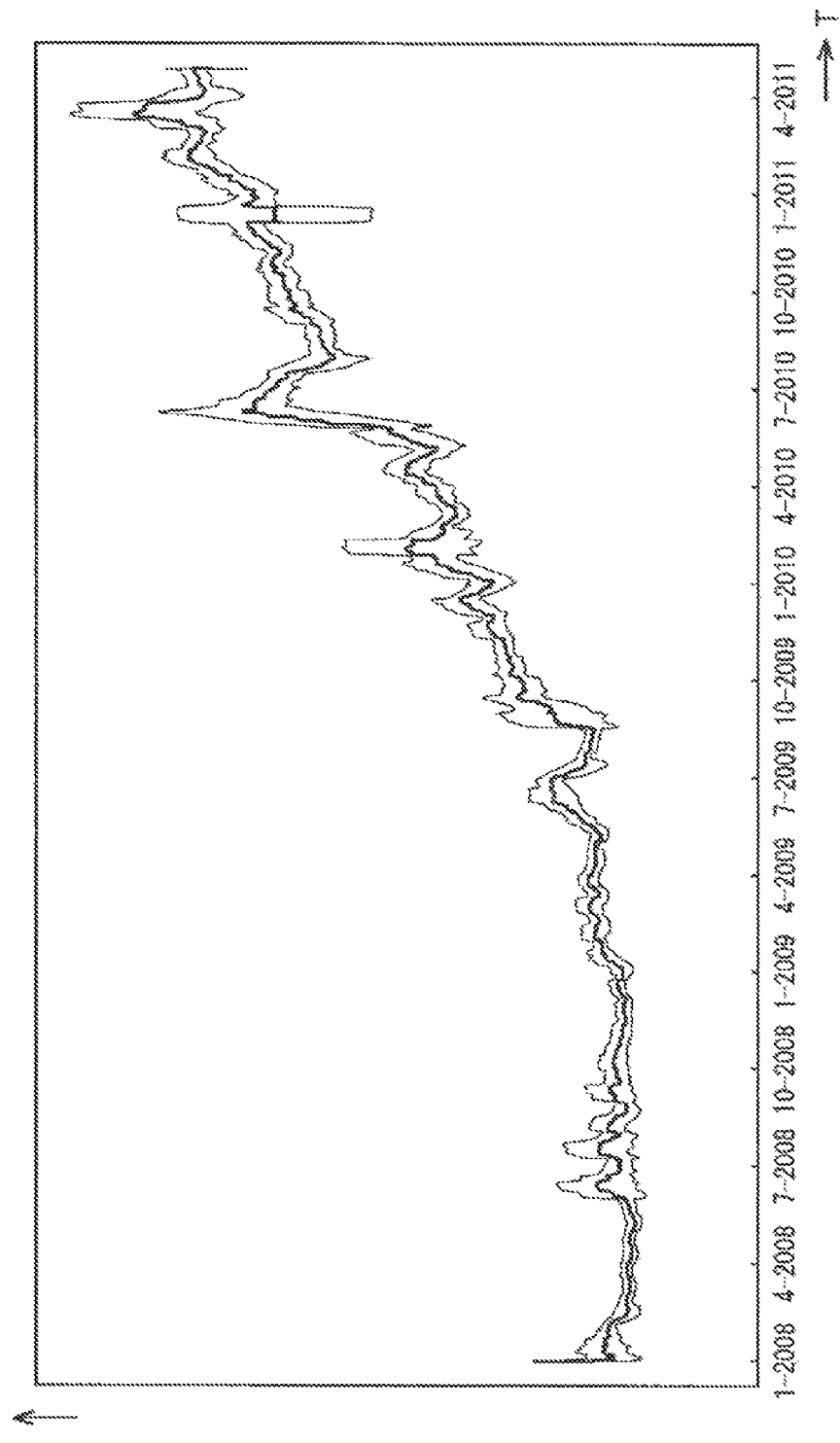
FIG. 11 is a diagram illustrating a movement mean and a movement variance of the frequency corresponding to FIG. 10.

For example, when the frequency $x_t$ functioning as the time-series data of the discrete system transits as illustrated in FIG. 10, the movement mean $m_t$ transits as illustrated by a thick line in FIG. 11 and the movement deviation $v_t$ transits in a form of stripes as illustrated by thin lines on the basis of the thick line in FIG. 11. Meanwhile, the evaluation value $s_t$ transits as illustrated in FIG. 12. FIG. 13 illustrates an overlapping state of FIGS. 10 and 12.

As can be seen from FIG. 13, the evaluation value $s_t$ increases when the frequency $x_t$ rapidly changes. Therefore, if the evaluation value $s_t$ is calculated with respect to the co-occurrence keyword, the evaluation value $s_t$ can be used as an index when it is determined whether the keyword has become a popular topic in the world (is trending).

The evaluation value $s_t$ shows a short-term popularity trend when the measurement period t is short and shows a long-term popularity trend when the measurement period t is long. Therefore, an evaluation value $s_{t\ (one\ day)}$ when the measurement period t is short (for example, one day=24 hours) and an evaluation value $s_{t\ (30\ days)}$ when the measurement period t is long (for example, one month=30 days) may be calculated and a weighted mean of the evaluation values may be calculated as a final evaluation value. The calculated final evaluation value may be used as an index to show the short-term popularity tendency and the long-term popularity tendency on whether the keyword has become a popular topic in the world (is trending).

[Other Use Destination of Evaluation Value]

The evaluation value $s_t$ may be variously used in addition to the determination of the popularity of the co-occurrence keyword.

For example, if a sales volume of each of various products in a predetermined period is set as the frequency $x_t$ and the evaluation value $s_t$ is calculated, the evaluation value may be used as an index to determine a hit product.

If the number of times of searches by the search keyword is set as the frequency $x_t$ and the evaluation value $s_t$ is calculated, the evaluation value may be used as an index to determine a keyword that has become a popular topic in the world.

The series of processes described above can be realized by hardware or software. When the series of processes is executed by software, a program forming the software is installed in a computer embedded in dedicated hardware and a general-purpose computer in which various programs can be installed and various functions can be executed, from a program recording medium.

FIG. 14 is a block diagram illustrating a configuration example of hardware of a computer that executes the series of processes by a program.

In a computer 100, a central processing unit (CPU) 101, a read only memory (ROM) 102, and a random access memory (RAM) 103 are connected mutually by a bus 104.

An input/output interface 105 is connected to the bus 104. An input unit 106 that includes a keyboard, a mouse, and a microphone, an output unit 107 that includes a display and a speaker, a storage unit 108 that is configured using a hard disk or a non-volatile memory, a communication unit 109 that is configured using a network interface, and a drive 110 that drives removable media 111 such as a magnetic disk, an optical disc, a magneto optical disc, or a semiconductor memory are connected to the input/output interface 105.

In the computer 100 that is configured as described above, the CPU 101 loads the programs stored in the storage unit 108 to the RAM 103 through the input/output interface 105 and the bus 104 and executes the programs, and the series of processes is executed.

The programs that are executed by the computer may be processed in time series according to the order described in the present disclosure and may be processed in parallel or at necessary timing when calling is performed.

One computer may process the programs and a plurality of computers may perform distributed processing on the programs. The programs may be transmitted to a remote computer and may be executed.

The embodiment of the present disclosure is not limited to the above example and various changes can be made without departing from the spirit and scope of the present disclosure.

The invention claimed is:

1. An information processing apparatus comprising:
   a processor configured to
   (i) search information including a search character string;
   (ii) extract a plurality of co-occurrence character strings from the information obtained as a search result;
   (iii) exclude a certain co-occurrence character string from the plurality of the co-occurrence character strings based on a frequency that the information including the certain co-occurrence character string also includes a particular character string; and (iv) adopt a topic candidate character string comprising the search character string with the certain co-occurrence character string excluded when a value obtained by dividing a frequency that the information includes the search character string by the frequency that the information includes the particular character string is equal to or greater than a predetermined frequency ratio threshold.

2. The information processing apparatus according to claim 1, wherein the processor is further configured to remove noises from the information obtained as the search result, wherein the co-occurrence character strings are extracted from the noise-removed information.

3. The information processing apparatus according to claim 1, wherein one of a character string input or a character string extracted on the basis of an operation history of a user is set as the search character string.

4. The information processing apparatus according to claim 1, wherein the information searched is of social media postings.

5. An information processing method performed by an information processing apparatus, the method comprising:

searching information including a search character string;

extracting a plurality of co-occurrence character strings from the information obtained as a search result;

excluding a certain co-occurrence character string from the plurality of the co-occurrence character strings based on a frequency that the information including the certain co-occurrence character string also includes a particular character string; and adopting a topic candidate character string comprising the search character string with the certain co-occurrence character string excluded when a value obtained by dividing a frequency that the information includes the search character string by the frequency that the information includes the particular character string is equal to or greater than a predetermined frequency ratio threshold.

6. The information processing method according to claim 5, further comprising removing noises from the information obtained as the search result, wherein the co-occurrence character strings are extracted from the noise-removed information.

7. The information processing method according to claim 5, wherein one of a character string input or a character string extracted on the basis of an operation history of a user is set as the search character string.

8. The information processing method according to claim 5, wherein the information searched is of social media postings.

9. A non-transitory computer-readable medium having embodied thereon a program, which when executed by a computer causes the computer to execute an information processing method, the method comprising:

searching information including a search character string;

extracting a plurality of co-occurrence character strings from the information obtained as a search result;

excluding a certain co-occurrence character string from the plurality of the co-occurrence character strings based on a frequency that the information including the certain co-occurrence character string also includes a particular character string; and adopting a topic candidate character string comprising the search character string with the certain co-occurrence character string excluded when a value obtained by dividing a frequency that the information includes the search character string by the frequency that the information includes the particular character string is equal to or greater than a predetermined frequency ratio threshold.

* * * * *